(12) United States Patent
Kim

(10) Patent No.: US 10,838,204 B2
(45) Date of Patent: Nov. 17, 2020

(54) HEAD UP DISPLAY APPRATUS FOR VEHICLE

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/374,061

(22) Filed: Apr. 3, 2019

(65) Prior Publication Data

US 2019/0302457 A1 Oct. 3, 2019

(30) Foreign Application Priority Data

Apr. 3, 2018 (KR) ........................ 10-2018-0038898

(51) Int. Cl.
*G02B 27/01* (2006.01)
*B60K 35/00* (2006.01)
*G01C 21/36* (2006.01)

(52) U.S. Cl.
CPC .......... *G02B 27/0149* (2013.01); *B60K 35/00* (2013.01); *B60K 2370/1529* (2019.05); *B60K 2370/52* (2019.05); *B60K 2370/70* (2019.05); *G01C 21/365* (2013.01); *G02B 2027/0159* (2013.01)

(58) Field of Classification Search
CPC ........ G02B 27/0149; G02B 2027/0159; B60K 2370/1529; B60K 2370/52; B60K 2370/70; B60K 35/00; G01C 21/365
USPC .......................................................... 345/7
See application file for complete search history.

(56) References Cited

U.S. PATENT DOCUMENTS

| 2014/0368097 | A1* | 12/2014 | Yomogita | G02B 27/0149 312/23 |
| 2015/0098133 | A1* | 4/2015 | Laycock | G02B 7/023 359/632 |
| 2015/0146299 | A1* | 5/2015 | Koseki | G02B 27/0101 359/632 |

* cited by examiner

*Primary Examiner* — Mark Edwards
(74) *Attorney, Agent, or Firm* — Knobbe Martens Olson & Bear LLP

(57) ABSTRACT

A head-up display apparatus for a vehicle may include: a housing defining an interior space, with an entrance formed on a side of the housing; a holder unit coupled at a side thereof to a combiner; a moving unit located in the interior space of the housing, rotatably coupled to the holder unit, and reciprocating in one direction to cause the combiner to be accommodated in the interior space of the housing or to be exposed to an outside through the entrance of the housing; a driving unit coupled to the moving unit to move the moving unit; and a tilting unit slidably coupled to the moving unit and coupled to the driving unit, the tilting unit being moved by the driving unit to cause the combiner to be tilted around an imaginary central axis transverse to the combiner.

13 Claims, 19 Drawing Sheets

{Prior Art}

HEAD UP DISPLAY APPRATUS FOR VEHICLE

CROSS-REFERENCES TO RELATED APPLICATIONS

The present application claims priority to Korean application number 10-2018-0038898, filed on Apr. 3, 2018, which is incorporated by reference in its entirety.

BACKGROUND OF THE INVENTION

The present invention relates to a head-up display apparatus for a vehicle, and more particularly, to a head-up display apparatus for a vehicle, which is capable of giving vehicle information to a user.

Generally, a head-up display (HUD) is a system in which various vehicle information is displayed as a virtual image on a windshield glass of a vehicle, thus allowing a driver to check the vehicle information with his or her eyes kept on the road while driving.

A combiner type of head-up display may be operated in various manners. For example, the combiner may be accommodated in and deployed out from the vehicle, if desired. Depending on the arrangement of an optical instrument in a mounting space of the head-up display for the vehicle, there are a horizontal combiner head-up display and a vertical combiner head-up display.

Particularly in a conventional horizontal combiner head-up display, the combiner is moved in a horizontal direction using a lead screw or the like. This is problematic in that the opening and closing speed of combiner is determined by a lead size of the lead screw and a motor speed, the deployment speed of the combiner is not fast, and the adjustment of the combiner angle depends on the size of the lead and the angle of a stepper motor.

FIG. 1 is a view illustrating the rotary displacement of a combiner in a conventional head-up display apparatus for a vehicle. Reference character E denotes the position of a user's eye, and reference characters G1 and G2 denote paths of indication light radiated from an optical instrument V.

Referring to FIG. 1, in the conventional combiner head-up display, a central axis AX about which the combiner M rotates is located at a lower end of the combiner M. Therefore, if the combiner M rotates to an optimal position for a user's eye in the state where the optical instrument outputs the indication light to the combiner M, a position on which the indication light is reflected may be changed in horizontal and vertical directions.

In this respect, a change in reflecting position of the indication light in the horizontal direction may be denoted by D1, while a change in reflecting position in the vertical direction may be denoted by D2. As such, the virtual image may be incident on a user in the state where the phase of the virtual image is changed by D1 in the horizontal direction and changed by D2 in the vertical direction, by the rotation of the combiner M.

Thus, since a virtual image visible to a user is distorted, he or she may misperceive the skewed virtual image or continuously watch the skewed virtual image, thus causing his or her eyes to be easily fatigued.

The related art of the present invention is disclosed in Korean Patent Publication No. 10-1558658 published on Oct. 1, 2015 and entitled "Head-up display apparatus for vehicle".

SUMMARY OF THE INVENTION

Embodiments of the present invention are directed to a head-up display apparatus for a vehicle, in which a combiner may be tilted not about a lower end of the combiner but about a center thereof.

In one embodiment, a head-up display apparatus for a vehicle may include: a housing defining an interior space, with an entrance formed on a side of the housing; a holder unit coupled at a side thereof to a combiner, the combiner going in and out through the entrance; a moving unit located in the interior space of the housing, rotatably coupled to the holder unit, and coupled to the housing to reciprocate in one direction, the moving unit reciprocating in one direction to cause the combiner to be accommodated in the interior space of the housing or to be exposed to an outside through the entrance of the housing; a driving unit coupled to the moving unit to move the moving unit; and a tilting unit slidably coupled to the moving unit and coupled to the driving unit, the tilting unit being moved by the driving unit to cause the combiner to be tilted around an imaginary central axis transverse to the combiner.

The holder unit may include a holder shaft rotatably coupled to the moving unit; a holder rotary member coupled to the holder shaft; a holder member including a holder portion to which the combiner is coupled, and an arc portion formed on a side of the holder portion such that at least a part thereof is in an arc shape; a tilting guide member coupled to the holder shaft, located between the holder rotary member and the holder shaft, and formed to surround at least a part of the arc portion, thus guiding tilting of the holder member; and an elastic member provided to elastically support the holder rotary member and the holder member, and causing the holder member to be restored to a position before it is tilted, if external force acting on the holder member is eliminated.

The holder unit may include a first support protrusion protruding from a side of the holder rotary member to support one side of the elastic member; and a second support protrusion protruding from a side of the holder member to support the other side of the elastic member.

The tilting unit may include a sliding member slidably coupled to the moving unit, and moved by the driving unit in a state where the moving unit stops moving, thus applying external force to the holder member and consequently causing the holder member to be tilted.

The tilting unit may further include a pressing member provided on a side of the sliding member to press the holder member.

The holder unit may include a guide pin protruding from an outside of the holder rotary member, and a guide groove may be formed on a portion in the housing with which the guide pin comes into contact, thus defining a movement path of the holder rotary member.

The driving unit may include a rotation motor; a rotation member rotated by the rotation motor; and a driving pin provided on a side of the rotation member, and located to pass through the moving unit and the tilting unit.

The moving unit may include a moving member slidably coupled to the housing and having a first guide groove through which the driving pin passes.

The first guide groove may include a first movement path formed on an edge of the moving member and causing the moving member to be moved in one direction as the driving pin moves; and a rest path connected with the first movement path, and having a curvature radius corresponding to a curvature radius of a moving trajectory of the driving pin.

A second guide groove may be formed on the sliding member to allow the driving pin to passes therethrough, the second guide groove including a second movement path formed on an edge of the sliding member and causing the sliding member to be moved along with the moving member as the driving pin moves; and a tilting path connected with the second movement path, and having a curvature radius different from the curvature radius of the moving trajectory of the driving pin.

The imaginary central axis transverse to the combiner may be an axis to prevent a change in position on a reflective surface of the combiner on which indication light is reflected, even if the combiner is tilted.

The head-up display apparatus may further include a sensing unit provided in the interior space of the housing to detect a position of the moving unit, and detecting that the combiner is accommodated in the interior space of the housing or exposed to the outside, based on a detected position of the moving unit.

The sensing unit may include a first position sensing member coupled to one side of the interior space of the housing to detect a position of the moving unit; and a second position sensing member coupled to the other side of the interior space of the housing to detect a position of the moving unit.

As described above, the head-up display apparatus for the vehicle in accordance with the present invention may cause the combiner to rotate about the imaginary central axis transverse to the combiner. Therefore, the head-up display apparatus for the vehicle in accordance with an embodiment of the present invention makes it easy to control the light path along which the imaginary image generated by the display module and reflected from the combiner travels. Consequently, the invention allows the imaginary image reflected from the combiner to be more clearly visible to a driver.

Furthermore, the head-up display apparatus for the vehicle in accordance with the present invention allows the sliding member included in the tilting unit to be finely moved by the driving unit. Moreover, since the holder member is pressed to be precisely tilted by the sliding member while being guided along the tilting guide member, the resolution of the combiner can be remarkably enhanced as compared to the conventional head-up display apparatus for the vehicle.

DESCRIPTION OF SPECIFIC EMBODIMENTS

Figure 1:
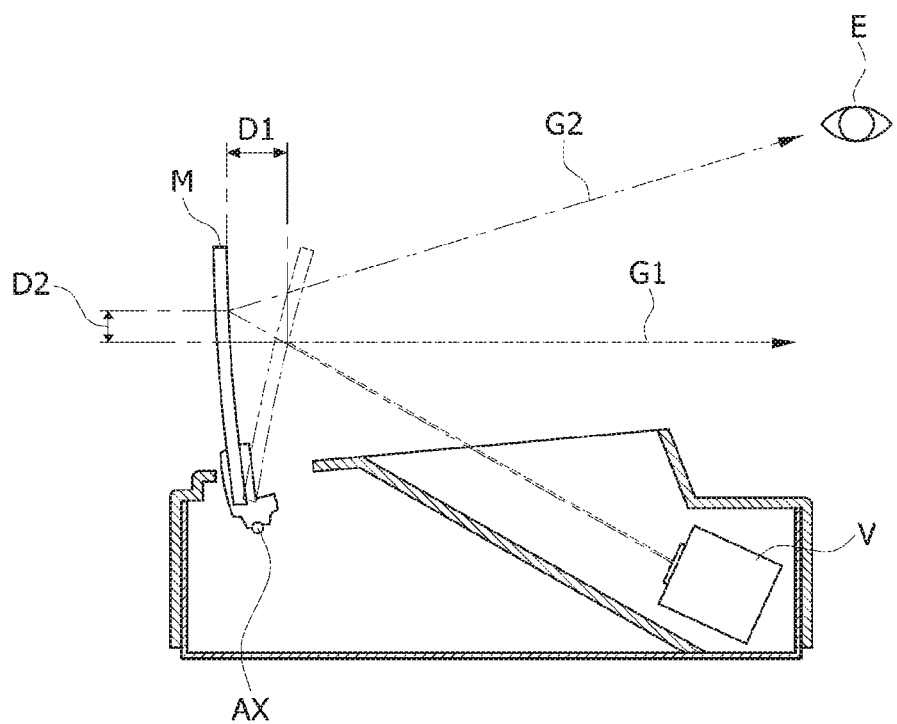
FIG. 1 is a view illustrating the rotary displacement of a combiner in a conventional head-up display apparatus for a vehicle.
Figure 1:
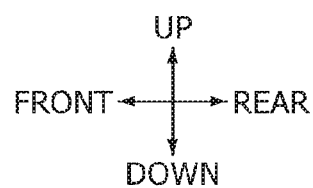
Figure 2:
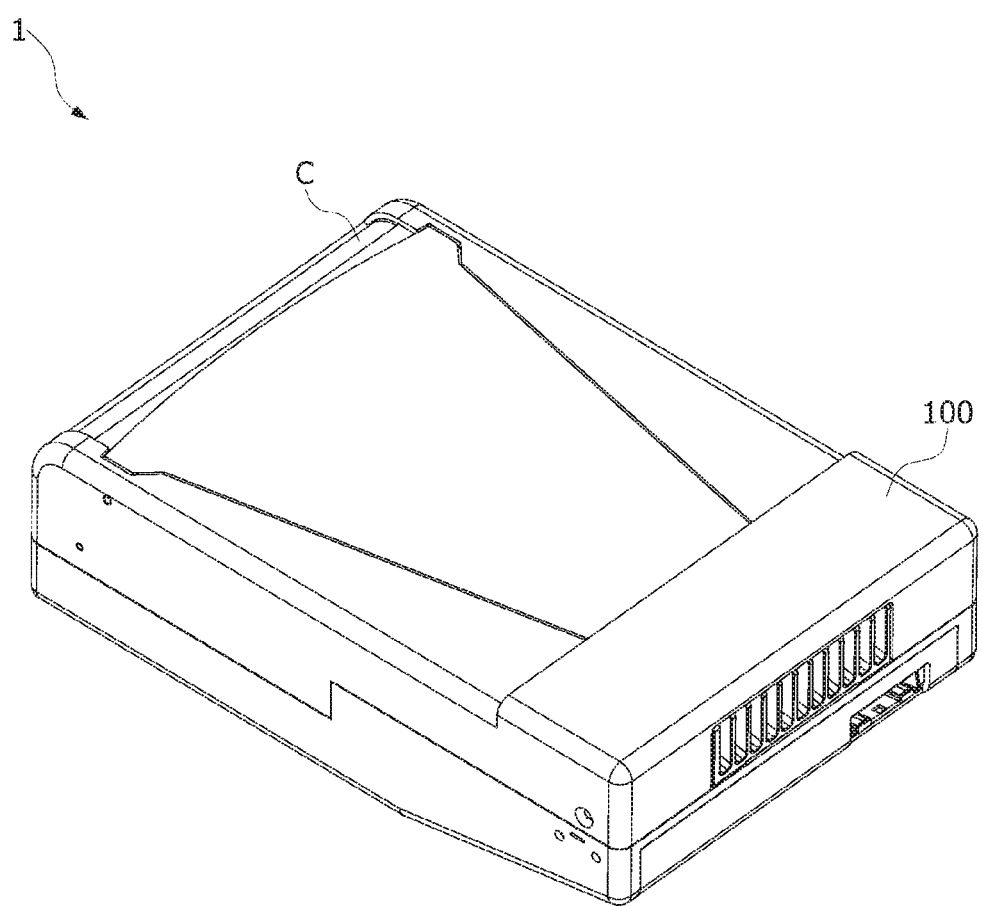
FIG. 2 is a view illustrating a head-up display apparatus for a vehicle in accordance with an embodiment of the present invention.
Figure 3:
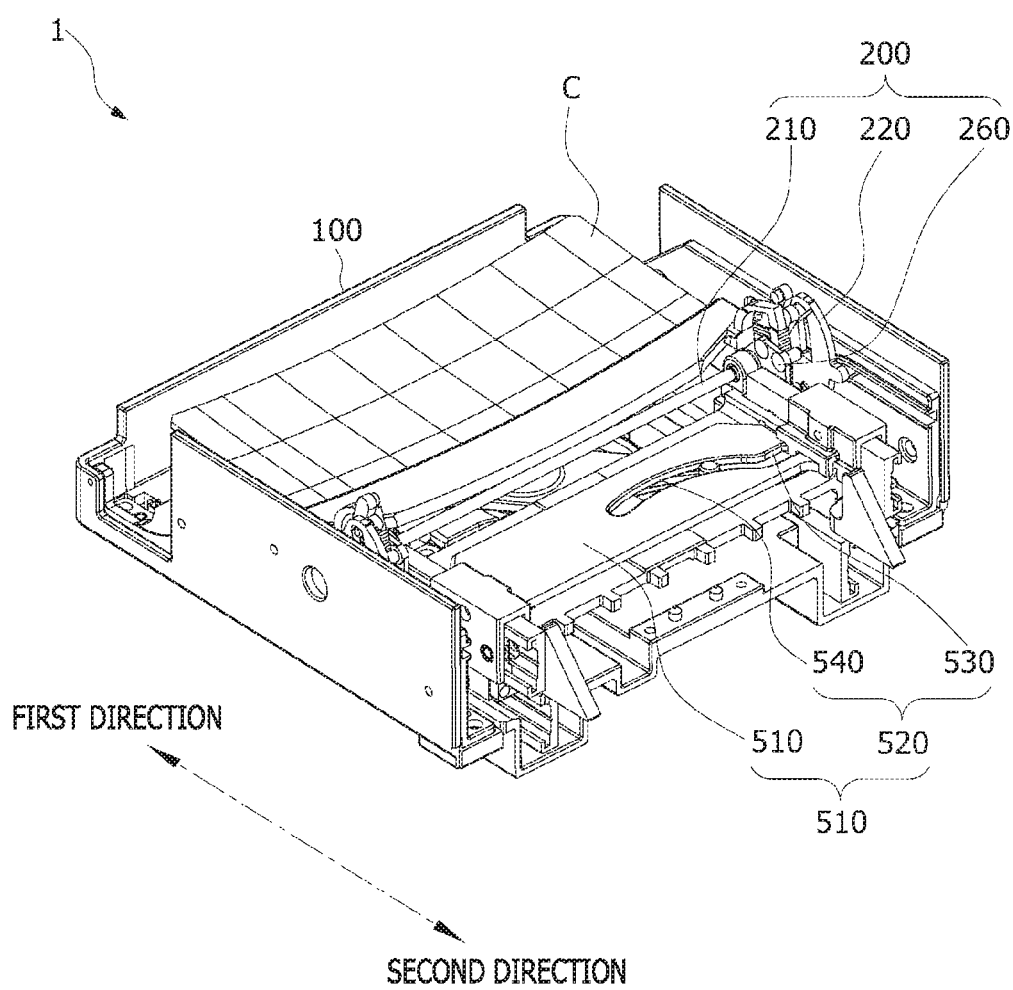
FIG. 3 is a view illustrating a state in which a housing is removed from the head-up display for the vehicle of FIG. 2.
Figure 4:
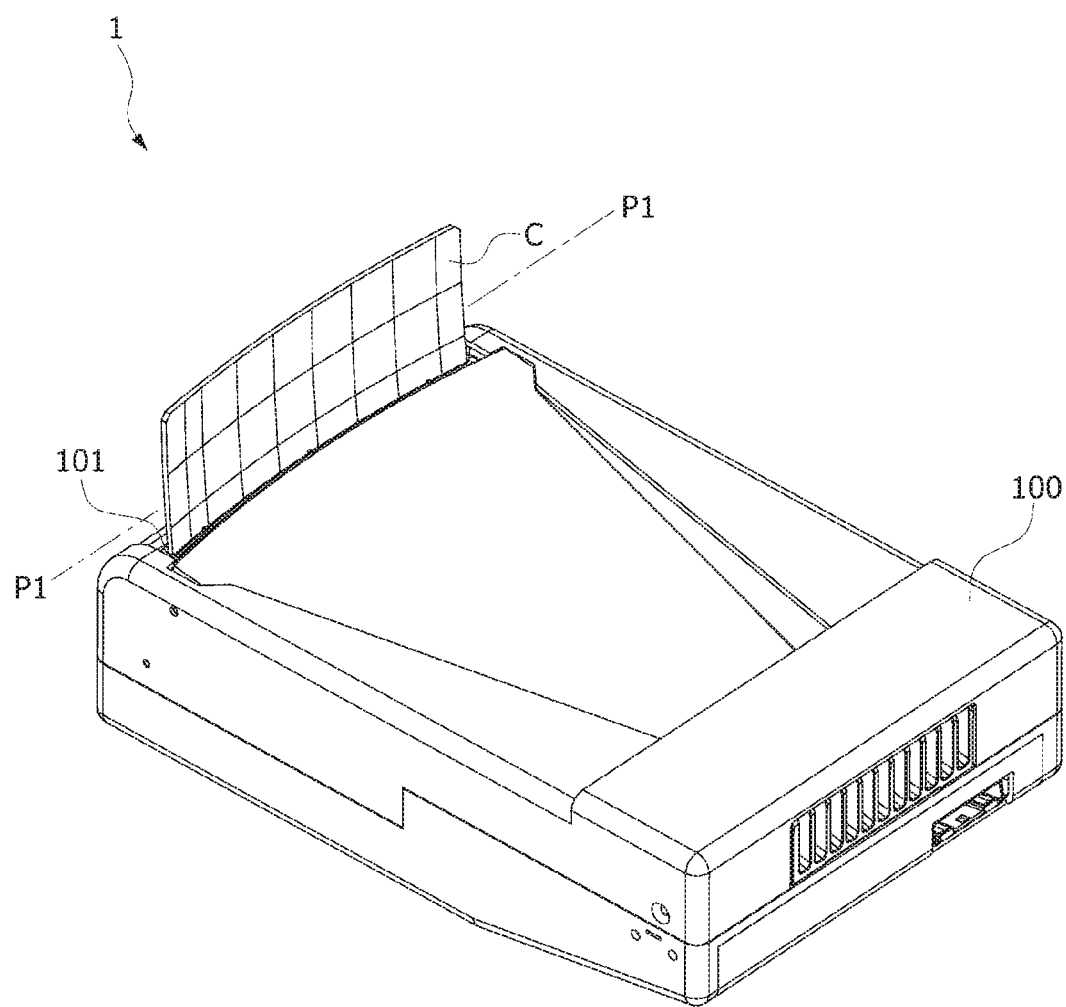
FIG. 4 is a view illustrating a state in which a combiner is exposed to an outside in the head-up display for the vehicle of FIG. 2.
Figure 5:
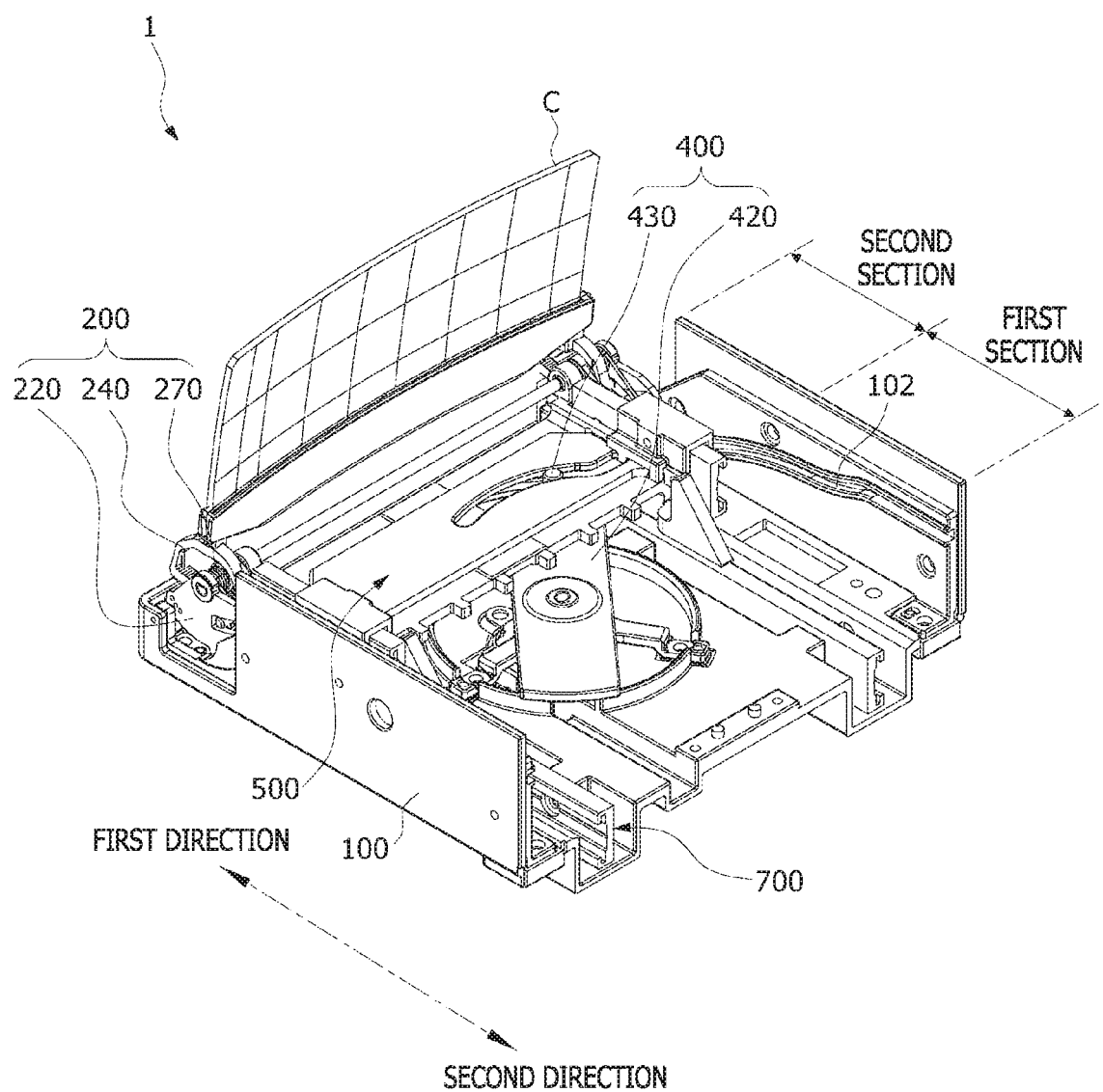
FIG. 5 is a view illustrating a state in which a housing is removed from the head-up display for the vehicle of FIG. 4.
Figure 6:
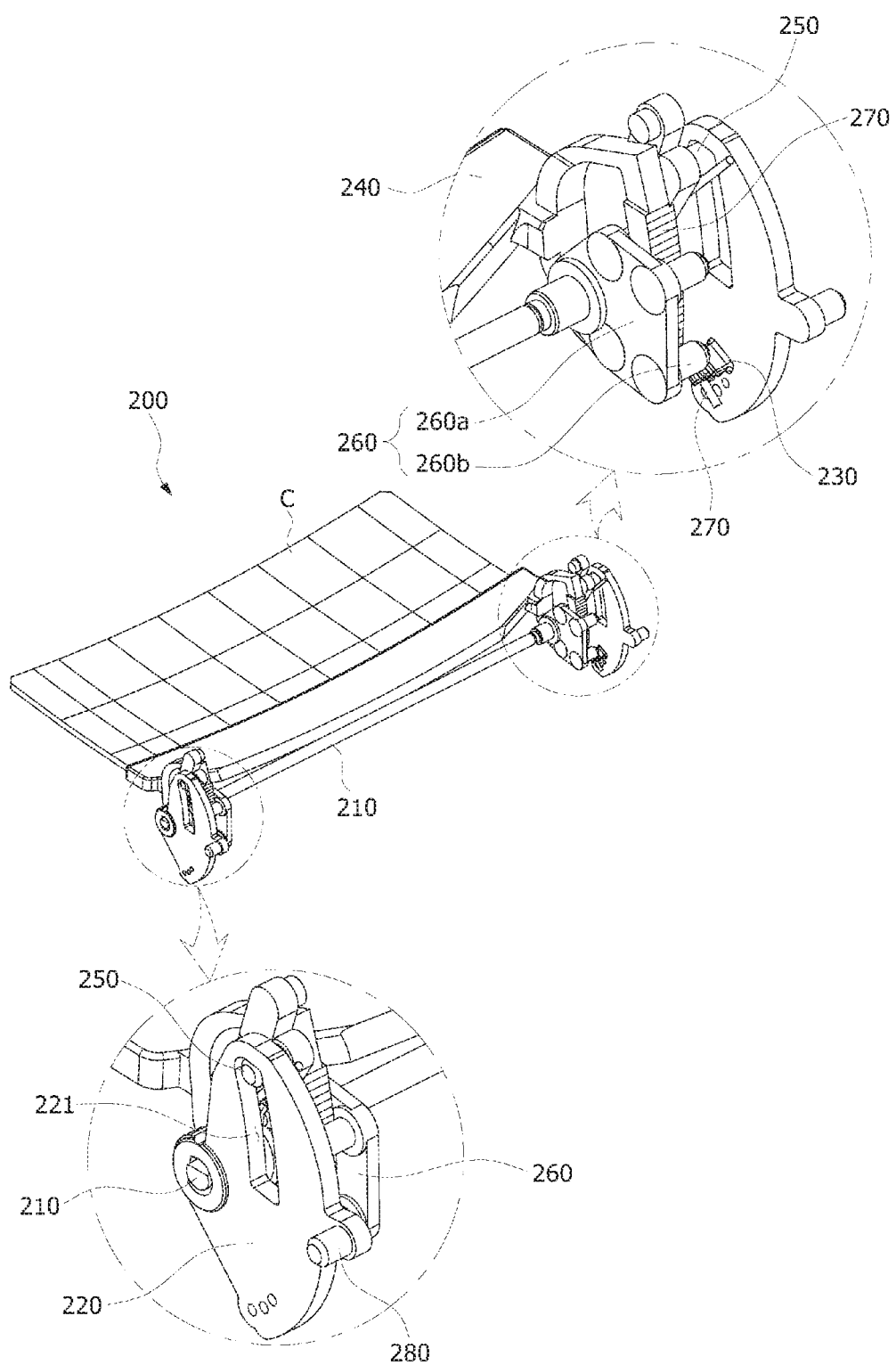
FIG. 6 is a perspective view illustrating a holder unit extracted from the head-up display apparatus for the vehicle.
Figure 7:
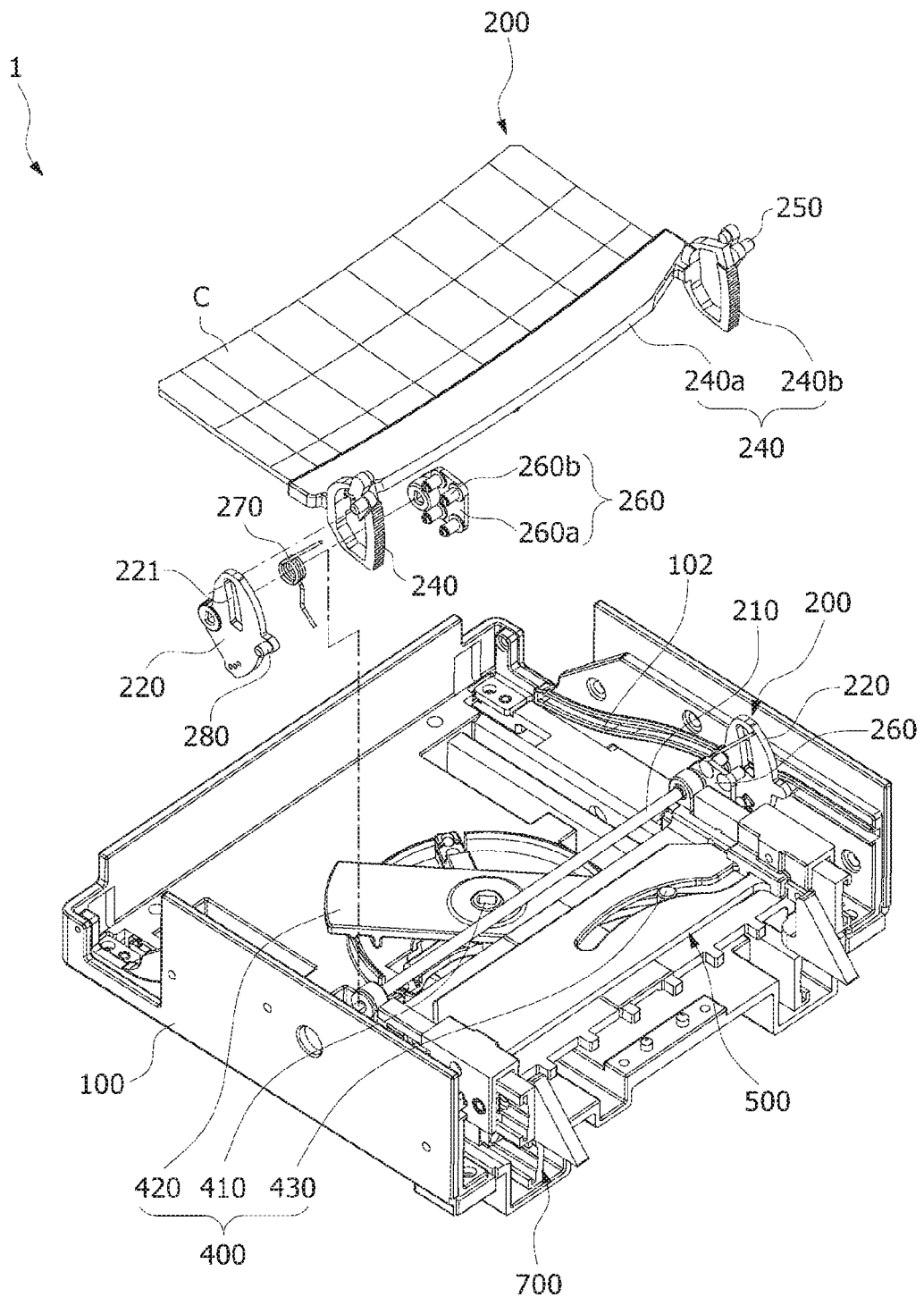
FIG. 7 is a view illustrating only the holder unit disassembled from the head-up display apparatus for the vehicle.
Figure 8A:
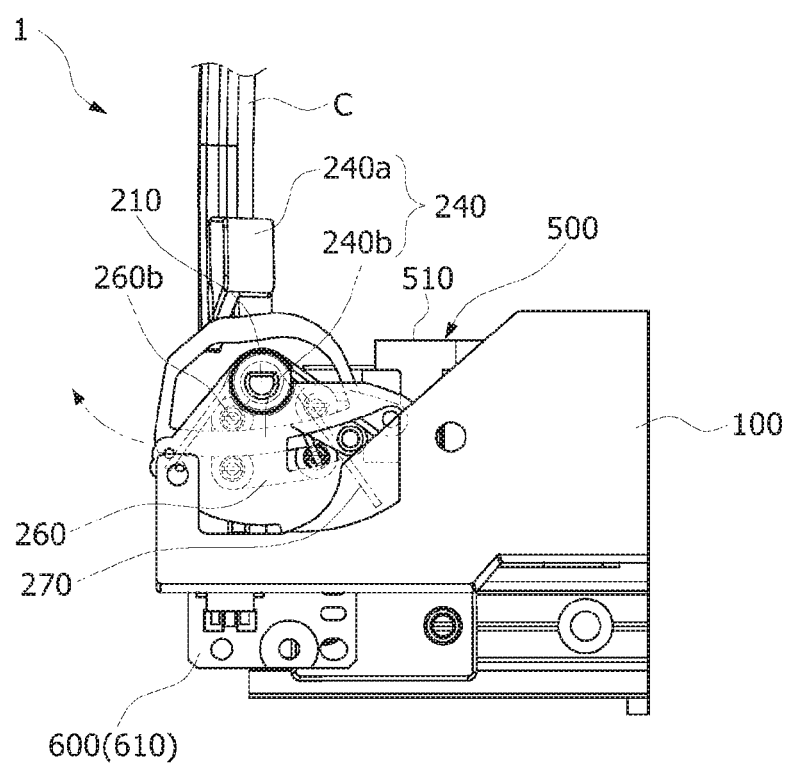
FIGS. 8A and 8B are side views illustrating the process of tilting a holder member.
Figure 8B:
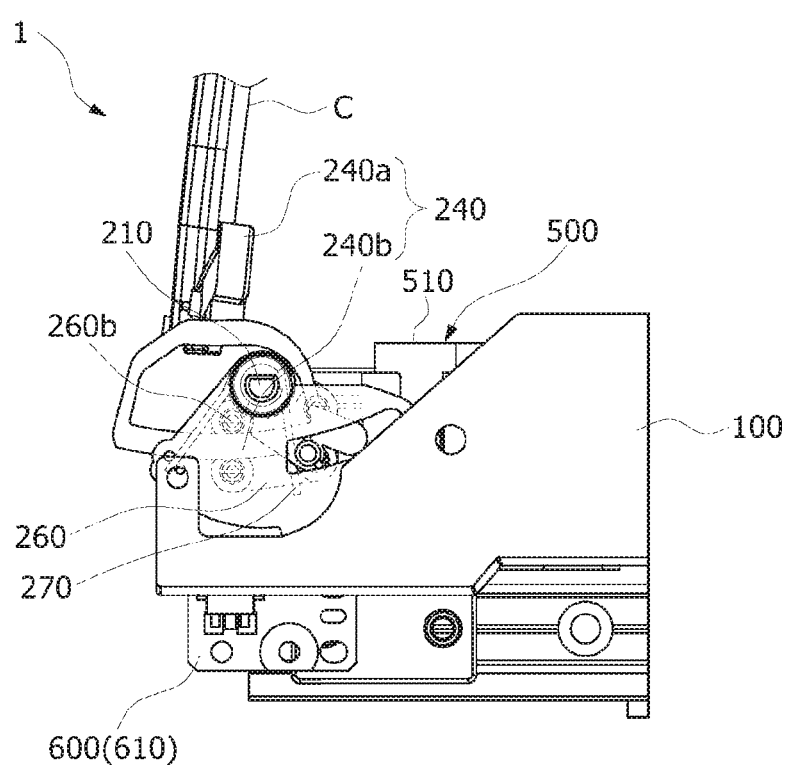
Figure 9:
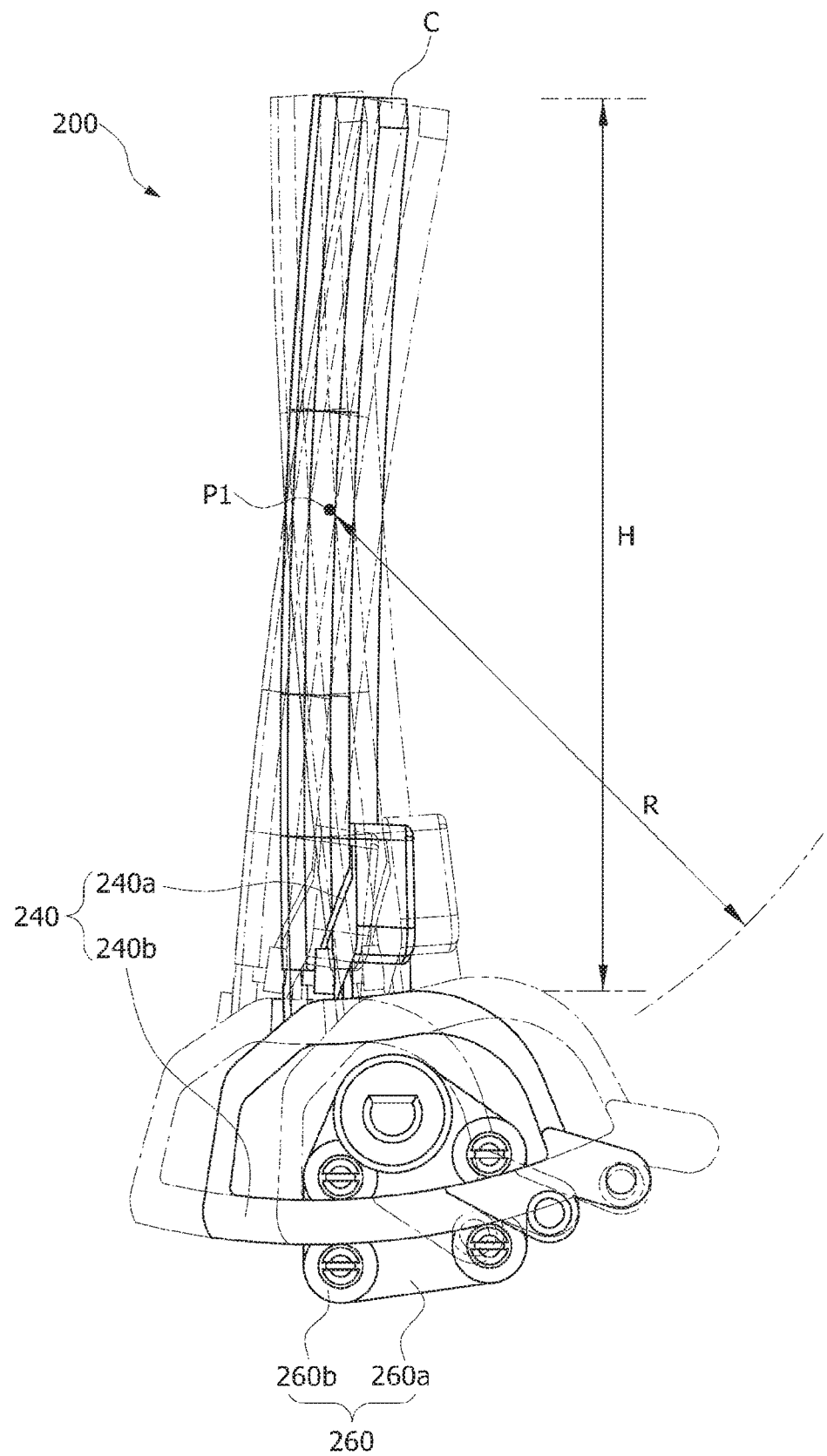
FIG. 9 is a view illustrating the holder member and a tilting guide member extracted from FIGS. 8A and 8B.
Figure 10:
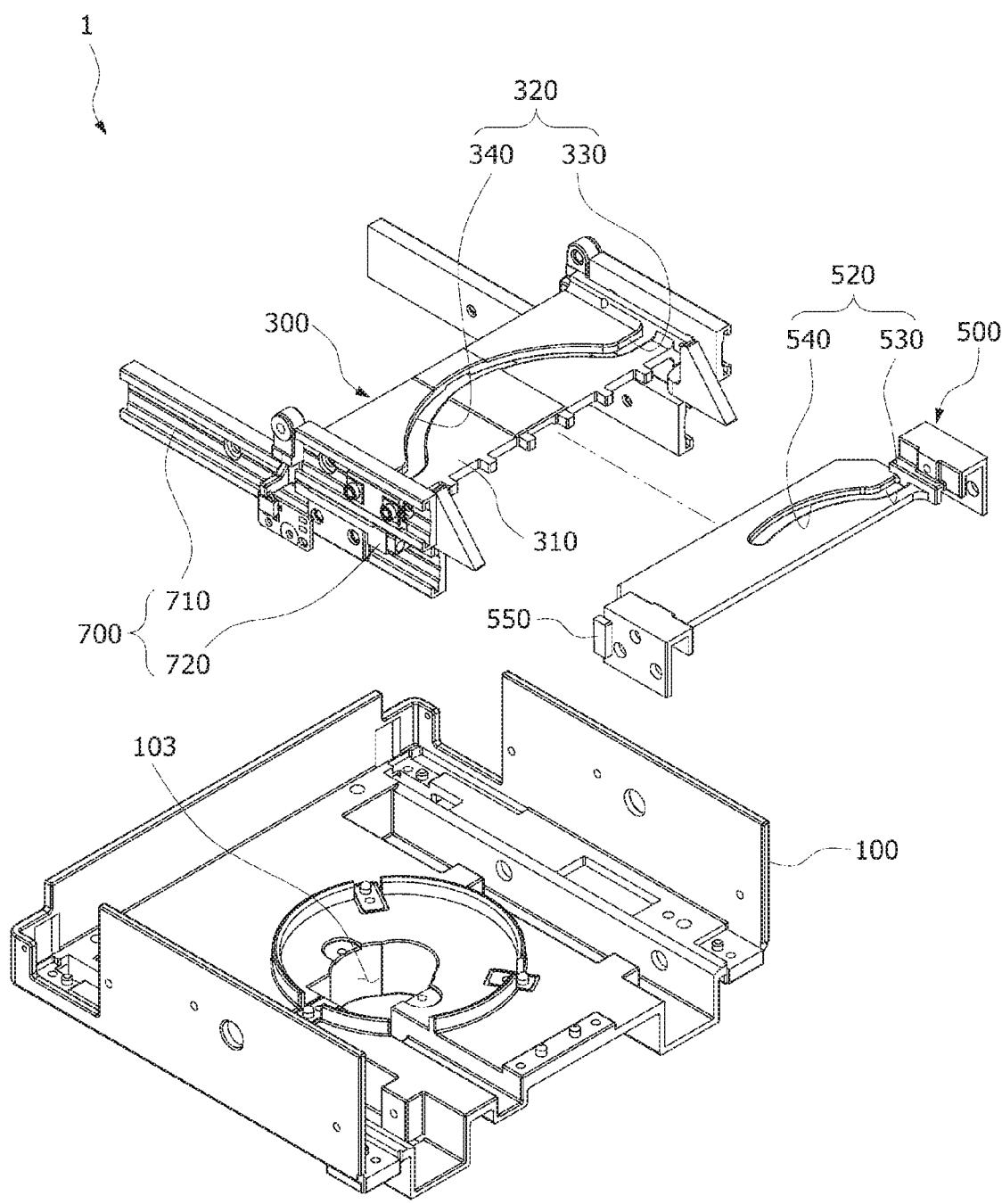
FIG. 10 is a view illustrating a moving unit and a tilting unit separated from the housing in the head-up display apparatus for the vehicle.
Figure 11:
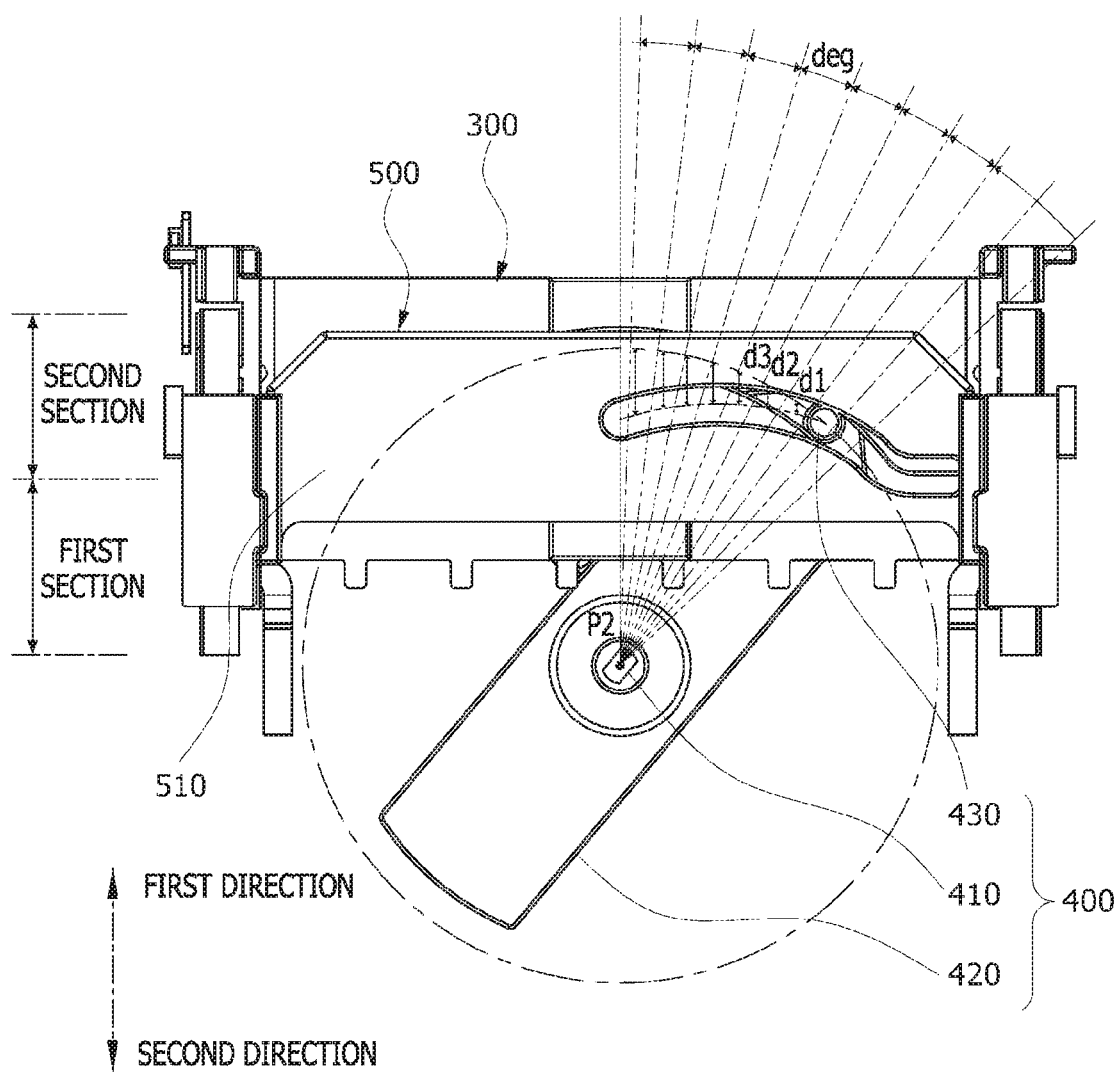
FIG. 11 is an extracted plan view illustrating the moving unit, the tilting unit and a driving unit.
Figure 12:
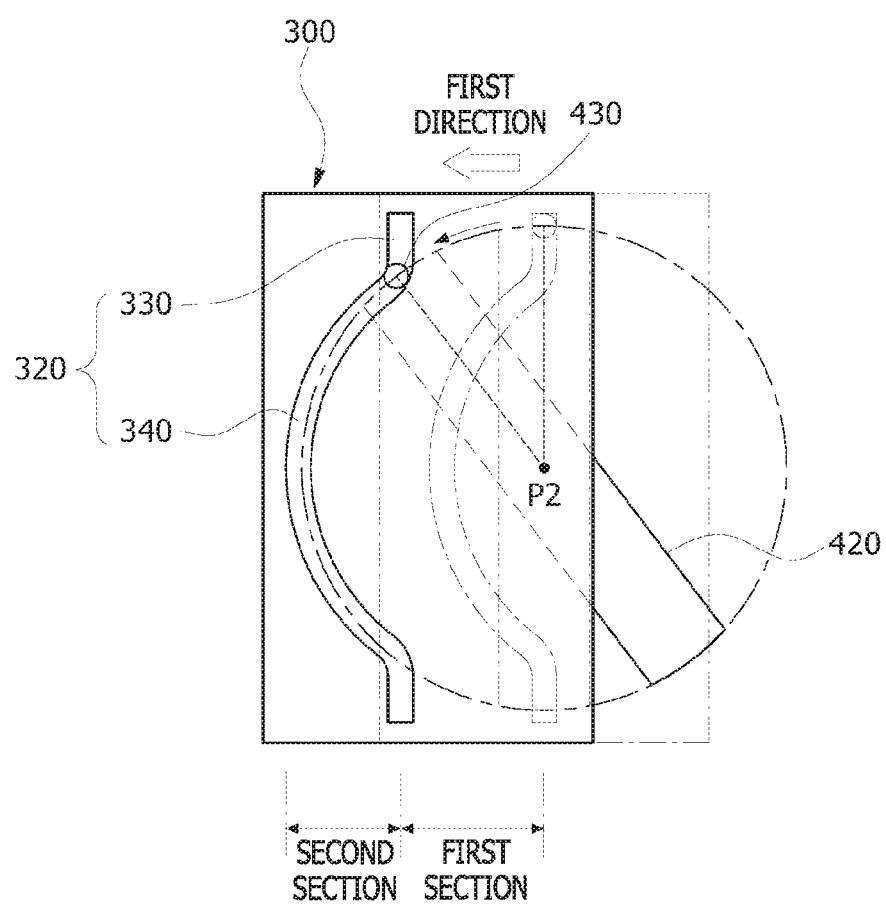
FIG. 12 is a view illustrating a process in which a moving member is moved by a driving pin.
Figure 13:
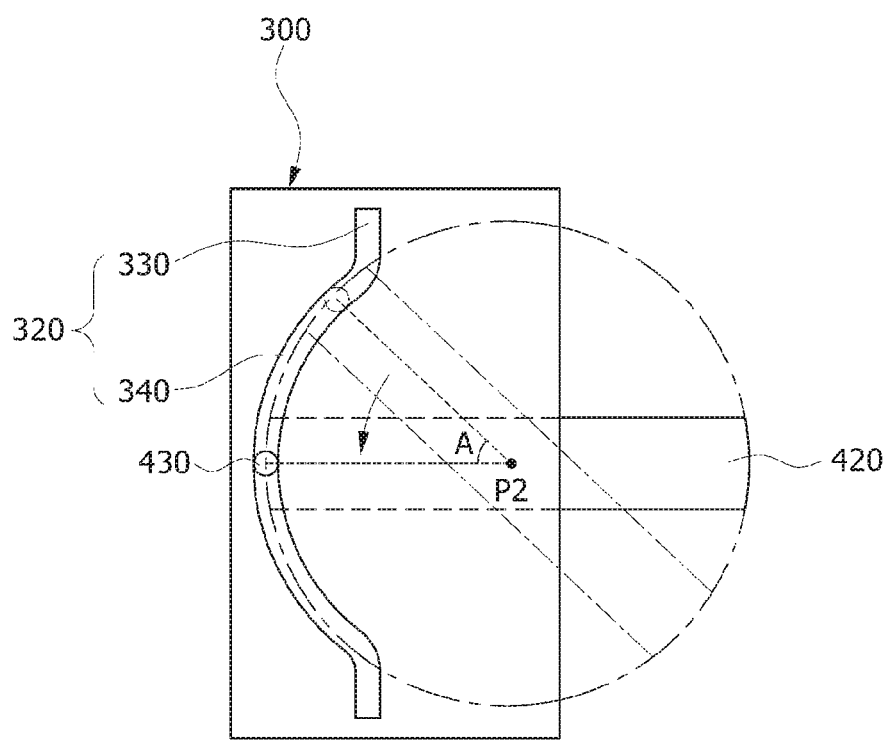
FIG. 13 is a plan view illustrating a state in which the driving pin passes through a rest path of the moving member.
Figure 14:
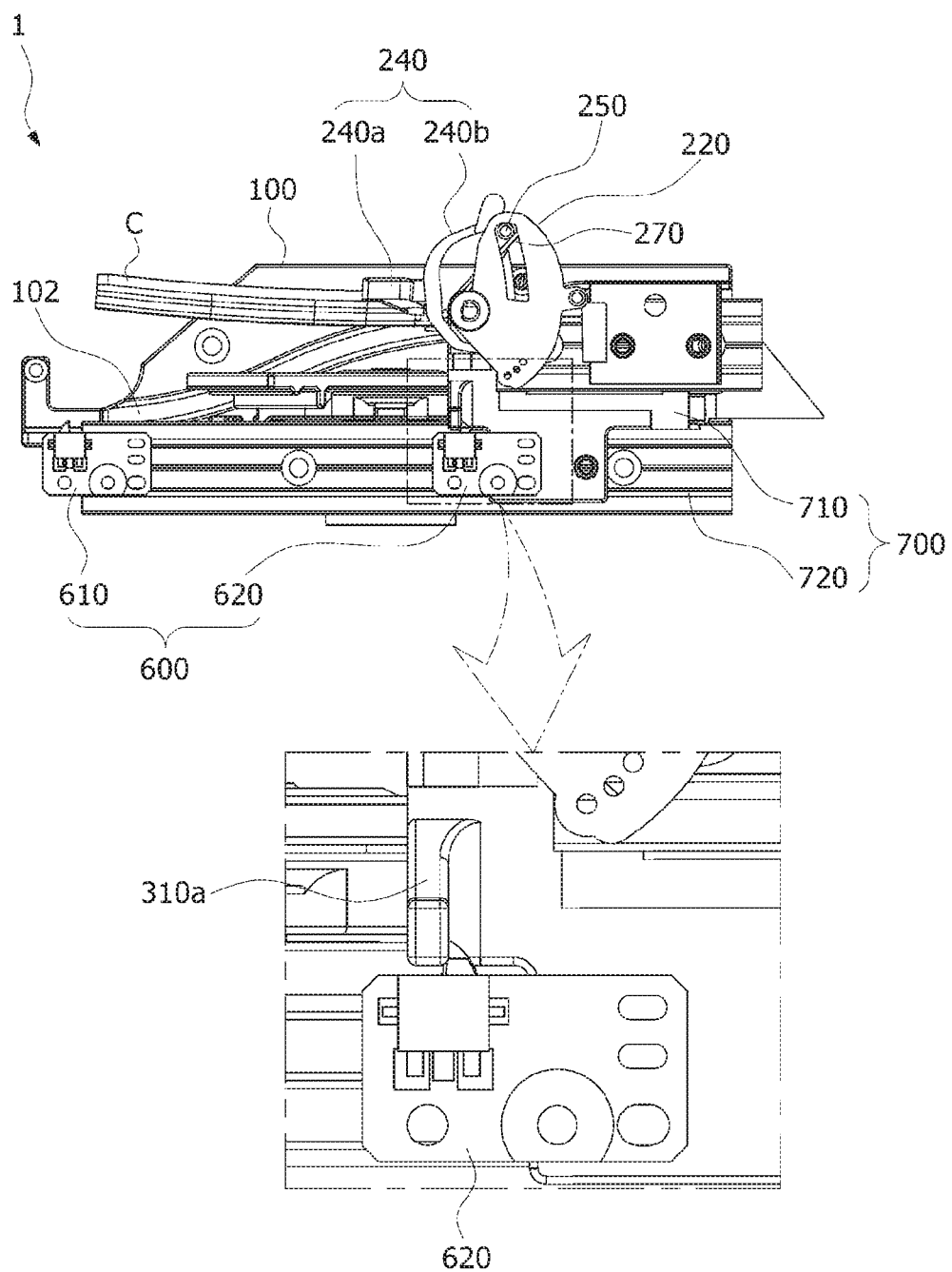
FIG. 14 is a side view illustrating portion of the head-up display apparatus for the vehicle in which a sensing unit is installed.

Hereafter, a head-up display apparatus for a vehicle in accordance with embodiments of the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Referring to FIGS. 2 to 14, the head-up display apparatus 1 for the vehicle in accordance with an embodiment of the invention includes a housing 100, a holder unit 200, a moving unit 300, a driving unit 400, and a tilting unit 500.

The housing 100 may define an appearance and a body of the head-up display apparatus 1 for the vehicle in accordance with the invention. An interior space may be defined in the housing 100. The holder unit 200, the moving unit 300, the driving unit 400 and the tilting unit 500 that will be described below may be located in the interior space of the housing 100.

An entrance 101 may be formed on a side of the housing 100. A combiner C that will be described below may be exposed to an outside of the housing 100 or accommodated in the housing 100 through the entrance 101. The entrance 101 may be penetrated to have a shape corresponding to a side of the combiner C. The housing 100 may be mounted on a dashboard (not shown) of the vehicle.

A display module 10 (see FIG. 16) may be mounted on a side of the housing 100. Alternatively, the display module 10 (see FIG. 16) may also be mounted on the dashboard of the vehicle. The display module 10 (see FIG. 16) generates an image to transfer it to the combiner C.

Meanwhile, the display module 10 (see FIG. 16) may be connected with an electronic control unit (ECU) (not shown) that performs an overall electronic control function in the vehicle to receive various information related to the vehicle, such as the travel speed and the engine condition of the vehicle, and thereby generate the image. For example, the display module 10 (see FIG. 16) may receive various position information related to a movement path to a specific destination when connected with a device such as a navigation terminal and then generate the image.

The image generated from the display module 10 (see FIG. 16) may be reflected through a mirror (not shown) or the like and then reflected again by the combiner C, so that the image may be transferred to the outside. Thus, a driver may confirm vehicle information without a device such as the navigation. The combiner C may be, for example, a semi-permeable reflection member of a plate shape, to clearly transfer the vehicle information image to the outside.

The combiner C may be coupled to a side of the holder unit 200. The combiner C may be accessed through the entrance 101. The holder unit 200 may be moved or tilted by the moving unit 300 that will be described below, and may be precisely tilted by the tilting unit 500. The detailed description of the holder unit 200 will be described below.

The moving unit 300 may be located in the interior space of the housing 100, and may be rotatably coupled to the holder unit 200. Furthermore, the moving unit 300 may be coupled to the housing 100 to be reciprocated in one direction.

As the moving unit 300 is reciprocated in one direction in the interior space of the housing 100 by the driving unit 400 that will be described below, the combiner C may be accommodated in the interior space of the housing 100, or may be exposed to the outside through the entrance 101 of the housing 100. The moving unit 300 will be described below in detail.

The driving unit 400 may be coupled to the moving unit 300 to move the moving unit 300. Furthermore, the driving unit 400 may also move the tilting unit 500 that will be described below. Anything is possible for the driving unit 400 as long as this may produce power. An example of the driving unit 400 will be described below.

The tilting unit 500 may be slidably coupled to the moving unit 300, and may be coupled to the driving unit 400. As the tilting unit 500 is moved by the driving unit 400, it may tilt the combiner C with respect to an imaginary central axis P1 that is transverse to the combiner C.

That is, the imaginary central axis P1 is a straight line about which the combiner C rotates. In greater detail, the imaginary central axis P1 that is transverse to the combiner C may be an axis P1 to prevent a change in position on the reflective surface of the combiner C from which indication light is reflected even if the combiner C is tilted.

Thus, if the combiner M rotates to an optimal position for a user's eye in the state where the display module 10 (see FIG. 16) outputs the indication light to the combiner M, a position on which the indication light is reflected may not be changed.

For this purpose, the tilting unit 500 will be described below in detail.

The above-described holder unit 200 may, for example, include a shaft, a holder rotary member 220, a holder member 240, a tilting guide member 260, and an elastic member 270.

The holder shaft 210 may be rotatably coupled to the moving unit 300. The holder shaft 210 may be in the shape of a rod, for example.

The holder rotary member 220 may be coupled to the holder shaft 210. The holder rotary member 220 may be rotated along with the holder shaft 210. By way of example, a method of coupling the holder rotary member 220 with the holder shaft 210 is as follows: an end portion of the holder shaft 210 may be formed as a polygon, and a portion of the holder rotary member 220 into which the holder shaft 210 is inserted may be recessed to correspond to the end portion of the holder shaft 210. Thus, the holder shaft 210 may be rotated along with the holder rotary member 220.

The holder member 240 may hold the combiner C. Such a holder member 240 may be coupled to the tilting guide member 260 that will be described below, and then may be moved along a curved path by the tilting guide member 260.

The holder member 240 may, for example, include a holder portion 240*a* and an arc portion 240*b*.

The combiner C may be coupled to the holder portion 240*a*. A groove (not shown) into which the combiner C may be inserted may be formed on a side of the holder portion 240*a*. Since the holder portion 240*a* and the combiner C are coupled to each other by various methods, such as adhesive bonding, press fitting or bolt fastening, the coupling method is not limited to a specific method.

At least a part of the arc portion 240*b* may be formed in the shape of an arc, and may be formed on a side of the holder portion 240*a*. In this regard, a curvature radius R of the arc portion 240*b* may be approximately ½ of the height H of the combiner C. The arc portion 240*b* may be moved by the tilting guide member 260 that will be described below. As such, if the combiner C is tilted in the state where the curvature radius of the arc portion 240*b* is approximately ½ of the height H of the combiner C, the imaginary central axis P1 about which the combiner C is tilted may be a central portion of the combiner C.

The tilting guide member 260 may be coupled to the holder shaft 210 to be located between the holder rotary member 220 and the holder shaft 210. The tilting guide member 260 may be formed to surround at least a part of the arc portion 240*b* of the holder member 240 and thereby guide the tilting of the holder member 240. The tilting guide member 260 may, for example, a base portion 260*a* and a plurality of tilting guide protrusions 260*b*.

The base portion 260*a* may be fixedly coupled to the holder shaft 210.

The plurality of tilting guide protrusions 260*b* may protrude from a side of the base portion 260*a*.

The plurality of tilting guide protrusions 260*b* may be four. In the case of the four tilting guide protrusions 260*b*, two protrusions may constitute one pair. One pair of tilting guide protrusions 260*b* may be located above and under the arc portion 240*b*, respectively.

In this regard, gears may be formed above and under the plurality of tilting guide protrusions 260*b*, respectively. Furthermore, the arc portion 240*b* may be a spur gear. Thus, the arc portion 240*b* may be precisely moved along the tilting guide member 260.

As described above, the head-up display apparatus 1 for the vehicle in accordance with the embodiment of the present invention, which is configured such that the combiner C is tilted while the holder member 240 moves along the tilting guide member 260, allows the holder member 240 to be precisely moved, in comparison with a conventional head-up display apparatus for a vehicle tilted about a lower end of a combiner as a central axis, thus remarkably enhancing the resolution of the combiner C.

The elastic member 270 may be installed to elastically support the holder rotary member 220 and the holder member 240. If external force exerted on the holder member 240 is eliminated, the elastic member 270 may cause the holder member 240 to be restored to a position before it is tilted.

An example of the elastic member 270 may include a torsion spring. A coil portion in the torsion spring may surround the holder shaft 210. Furthermore, one end of the torsion spring may be supported by a part of the holder member 240, while the other end of the torsion spring may be supported by a part of the holder rotary member 220. In other words, the torsion spring may elastically support the holder member 240 and the holder rotary member 220 to allow the holder member 240 and the holder rotary member 220 to be rotated relative to each other and restored to its original position.

To this end, the holder unit 200 will be described in greater detail. The holder unit 200 may include a first support protrusion 230 and a second support protrusion 250.

The first support protrusion 230 may protrude from a side of the holder rotary member 220 to support one side of the elastic member 270. The first support protrusion 230 may protrude from a surface of the holder rotary member 220 facing the holder member 240.

The second support protrusion 250 may protrude from a side of the holder member 240 to support the other side of the elastic member 270. The second support protrusion 250 may protrude from a surface of the holder member 240 facing the holder rotary member 220.

In this regard, a removal prevention groove 221 may be formed in the holder rotary member 220. The second support protrusion 250 may be located to pass through the removal prevention groove 221. Thus, it is possible to set the initial position of the holder member 240 with respect to the holder rotary member 220. Moreover, the relative rotation between the holder rotary member 220 and the holder member 240 may be more stably performed.

If the external force acts on the holder member 240 of the above-described holder unit 200, the first support protrusion 230 and the second support protrusion 250 may come near to each other. In this case, the combiner C may be tilted.

By contrast, if the external force acting on the holder member 240 is eliminated, the first support protrusion 230 and the second support protrusion 250 may be moved apart from each other by the elastic member 270. In this case, the combiner C may be restored to a position before it is tilted. In this regard, the external force acting on the holder member 240 may be produced by the tilting unit 500.

For this purpose, the tilting unit 500 may, for example, include a sliding member 510.

The sliding member 510 may be slidably coupled to the moving unit 300. The sliding member 510 may be moved by the driving unit 400 in the state where the moving unit 300 stops moving, and may cause the holder member 240 to be tilted as the external force acts on the holder member 240.

To be more specific, the tilting unit 500 may move along with the moving unit 300 in a first section of the interior space of the housing 100 as the driving unit 400 operates. Subsequently, if the driving unit 400 is continuously operated, the moving unit 300 may stop moving, and the tilting unit 500 may move towards the holder unit 200 in a second section. In this case, the combiner C may be tilted.

By contrast, the tilting unit 500 may be moved apart from the holder unit 200 while the driving unit 400 is operated in a manner opposed to the above-described manner in the state where the moving unit 300 stops moving. In this case, the combiner C may be restored to a position before it is tilted. Furthermore, the tilting unit 500 may be moved in a second direction to move apart from the holder unit 200 along with the moving unit 300. A process in which the sliding member 510 and the moving unit 300 are moved and the driving unit 400 will be described below in detail.

As described above, the tilting unit 500 is configured such that the sliding member 510 is finely moved by the driving unit 400. Furthermore, since the holder member 240 included in the above-described holder unit 200 may be pressed to be precisely tilted by the sliding member 510 while being guided along the tilting guide member 260, the resolution of the combiner C may be remarkably enhanced in comparison with the conventional head-up display apparatus for the vehicle.

Meanwhile, the above-described tilting unit 500 may further include a pressing member 550.

The pressing member 550 may be formed on a side of the sliding member 510 to press the holder member 240. In detail, the pressing member 550 may be formed on the sliding member 510 to be adjacent to the holder member 240. The pressing member 550 may be in the shape of a block, for example.

Such a pressing member 550 may be integrated with the sliding member 510. The holder member 240 included in the holder unit 200 may be more stably pressed by the pressing member 550.

Meanwhile, the above-described holder unit 200 may include a guide pin 280. The guide pin 280 may protrude from an outside of the holder rotary member 220. Furthermore, a guide groove 102 may be formed on a portion of the housing 100 with which the guide pin 280 comes into contact, thus defining the movement path of the holder rotary member 220.

The moving unit 300 may be moved by the driving unit 400, and the holder unit 200 may be moved by the moving unit 300. In this course, the guide pin 280 may be guided by the guide groove 102. The guide groove 102 may be formed on an inner surface of the housing 100.

The guide groove 102 may be downwardly inclined in a first direction. In the state where the combiner C is accommodated in the housing 100, the guide pin 280 may be located at a height similar to that of the holder shaft 210 included in the holder unit 200 with respect to a bottom surface of the housing 100. While the holder unit 200 moves in the first direction, the guide pin 280 may move to be relatively lower than the holder shaft 210 included in the holder unit 200.

Furthermore, the holder rotary member 220 and the holder member 240 included in the holder unit 200 may rotate about the holder shaft 210. Therefore, the combiner C may be exposed to the outside through the entrance 101 of the housing 100 to be approximately perpendicular to the housing 100.

The above-described driving unit 400 may, for example, include a rotation motor 410, a rotation member 420, and a driving pin 430.

The rotation motor 410 may serve to generate a rotating force. The rotation motor 410 may be installed in an installation space 103 defined in the housing 100. However, the rotation motor 410 may be located outside of the housing 100 without being limited thereto.

The rotation member 420 may be rotated by the rotation motor 410. The rotation member 420 may be in the shape of a stick, by way of example. Furthermore, a central portion P2 of the rotation member 420 may be coupled to the rotation shaft of the rotation motor 410. The rotation member 420 may be located adjacent to the bottom surface of the housing 100.

The driving pin 430 may be formed on a side of the rotation member 420. To be more specific, the driving pin 430 may be located on either end of the stick-shaped rotation member 420 to face upwards. The driving pin 430 may be integrated with the rotation member 420.

Such a driving pin 430 may be located to pass through the moving unit 300 and the tilting unit 500. The rotation member 420 may be rotated by the rotation motor 410. In this case, the driving pin 430 may rotate at a predetermined angle along with the rotation member 420 to move both the moving unit 300 and the tilting unit 500 or only one of the moving unit 300 or the tilting unit 500.

The above-described driving unit 400 may rotate the rotation member 420, thus causing the moving unit 300 to repeatedly reciprocate linearly. Furthermore, the rotating force of the rotation member 420 may be transmitted to the combiner C to cause it to be rapidly exposed or accommodated.

Hereinafter, a process in which the moving unit 300 is moved by the rotation of the driving pin 430 will be described in detail.

The moving unit 300 may include a moving member 310. The moving member 310 may be slidably coupled to the housing 100. The moving member 310 may reciprocate linearly in the first or second direction. Thus, the combiner C may be exposed to the outside of the housing 100 or accommodated in the housing 100.

A first guide groove 320 may be formed on the moving member 310. The driving pin 430 may pass through the first guide groove 320. Therefore, as the driving pin 430 rotates about a reference point of the rotation member 420, the moving member 310 may move. To this end, the first guide groove 320 may be vertically formed in a part of the moving member 310 so that the driving pin 430 passes therethrough.

Such a first guide groove 320 may, for example, include a first movement path 330 and a rest path 340.

The first movement path 330 may be formed on an edge of the moving member 310. The first movement path 330 may cause the moving member 310 to be moved in one direction as the driving pin 430 moves. Such a first movement path 330 may be the shape of a straight line that is perpendicular to the moving direction of the moving member 310 without being limited thereto. Various variants forming a predetermined angle with the moving direction of the moving member 310 are possible.

The rest path 340 may be connected with the first movement path 330. Furthermore, the rest path 340 may have a curvature radius corresponding to a curvature radius of a moving trajectory of the driving pin 430. That is, the rest path 340 may have the same curvature radius as the curvature radius of the moving trajectory of the driving pin 430. Thus, while the driving pin 430 moves along the rest path 340 that is a predetermined angle range A (see FIG. 13), the moving member 310 may maintain a current position without moving in the first or second direction.

Meanwhile, a second guide groove 520 may be formed on the sliding member 510 so that the driving pin 430 passes therethrough. The second guide groove 520 may, for example, include a second movement path 530 and a tilting path 540.

The second movement path 530 may be formed on the edge of the sliding member 510. The second movement path 530 may cause the sliding member 510 to be moved along with the moving member 310 as the driving pin 430 moves.

The first movement path 330 may be the shape of a straight line that is perpendicular to the moving direction of the sliding member 510 without being limited thereto. Various variants forming a predetermined angle with the moving direction of the sliding member 510 are possible.

The tilting path 540 may be connected with the second movement path 530. The tilting path 540 may be formed to consistently increase the linear moving distance of the sliding member 510 as the driving pin 430 rotates. The tilting path 540 may have a curvature radius different from the curvature radius of the moving trajectory of the driving pin 430. For example, the curvature radius of the tilting path 540 may be larger than the curvature radius of the moving trajectory of the driving pin 430.

By contrast, the curvature radius of the tilting path 540 may be smaller than the curvature radius of the moving trajectory of the driving pin 430. That is, as the tilting path 540 may be distant from the second movement path 530, it may come closer to a portion P2 about which the rotation member 420 rotates than the rest path 340.

As such, the arc shape of the second guide groove 520 may be closer to a central point P2 than the arc shape of the first guide groove 320. Thus, the moving member 310 may not move on the rest path 340 of the first guide groove 320, and the sliding member 510 may be further moved in the first direction as compared to the moving member 310. Here, the tilting path 540 is not limited to the above-described shape. That is, any shape is possible as long as only the sliding member 510 moves while the driving pin 430 moves on the rest path 340.

While the driving pin 430 moves along the tilting path 540, the moving member 310 may remain stopped, and the sliding member 510 may move in the first or second direction.

Therefore, when the above-described moving member 310 and sliding member 510 are moved towards the holder unit 200 by the driving pin 430, the moving member 310 may be moved by the first movement path 330, and the sliding member 510 may be moved along with the moving member 310 by the second movement path 530. Subsequently, if the driving pin 430 continues to rotate, the moving member 310 may be stopped by the rest path 340, and the sliding member 510 may be moved towards the holder unit 200 by the tilting path 540. In other words, the moving member 310 may not be moved, and only the sliding member 510 may be finely moved.

Meanwhile, in the head-up display apparatus 1 for the vehicle in accordance with the embodiment of the present invention, the sliding member 510 may be moved by L whenever the rotation member 420 rotates by a predetermined angle (deg). This may be expressed by Equation 1.

$$d_n = d_{n-1} + L(n>1, d_1 = L) \qquad \text{[Equation 1]}$$

Thus, the moving distance of the sliding member 510 according to the rotation angle of the driving unit 400 may be accurately predicted by the tilting path 540, and the combiner C may be adjusted to a designed angle through the moving distance of the sliding member 510.

Meanwhile, the head-up display apparatus 1 for the vehicle in accordance with the embodiment of the present invention may further include a sensing unit 600.

The sensing unit 600 may be installed in the interior space of the housing 100 to detect the position of the moving unit 300, thus indirectly detecting that the combiner C is accommodated in the interior space of the housing 100 or exposed to the outside, based on a detected position of the moving unit 300.

Such a sensing unit 600 may, for example, include a first position sensing member 610 and a second position sensing member 620.

The first position sensing member 610 may be coupled to one side of the interior space of the housing 100 to detect the position of the moving unit 300.

The second position sensing member 620 may be coupled to the other side of the interior space of the housing 100 to detect the position of the moving unit 300. The first position sensing member 610 and the second position sensing member may be electrically connected to a control unit (not shown). The control unit may indirectly determine that the combiner C is accommodated or exposed depending on whether either of the first position sensing member 610 or the second position sensing member detects the position of the moving unit 300.

The first position sensing member 610 and the second position sensing member 620 may be in the form of a switch. However, without being limited thereto, various variants including a contact sensor for generating an electric signal are possible as long as it comes into contact with the moving unit 300.

For example, the first position sensing member 610 and the second position sensing member 620 may be in the form of a switch. Furthermore, the moving unit 300 may include a location protrusion 310*a* protruding from an end of the moving member 310.

As the moving member 310 moves, it may come into contact with the first position sensing member 610 or the second position sensing member 620. If the first position sensing member 610 comes into contact with the location protrusion 310*a*, the control unit (not shown) may determine that the combiner C is accommodated in the housing 100. By contrast, if the second position sensing member 620 comes into contact with the location protrusion 310*a*, the control unit (not shown) may determine that the combiner C is exposed to the outside of the housing 100.

Meanwhile, the head-up display apparatus 1 for the vehicle in accordance with the embodiment of the present invention may further include a rail unit 700.

The rail unit 700 may allow the moving unit 300 to be smoothly moved in the housing 100. To this end, the rail unit 700 may include a rail member 710 and a rail block 720.

The rail member 710 may be in the shape of a rail, for example. The rail member 710 may be mounted on the bottom surface of the housing 100. The rail member 710 may be integrated with the housing 100.

The rail block 720 may be coupled to the upper side of the rail member 710 to be movable along the rail member 710. The moving unit 300 may be coupled to the rail block 720. The moving unit 300 may be more smoothly moved in the housing 100 by the rail unit 700. The rail member 710 and the rail block 720 are not limited to a specific shape, and may have any shape as long as the moving unit 300 moves smoothly in the housing 100.

Hereinafter, the operation of the head-up display apparatus 1 for the vehicle in accordance with an embodiment of the present invention will be described. Since the operation of each unit has been already described in detail, the detailed description of each unit will be omitted herein.

When a user desires to use the head-up display apparatus 1 for the vehicle, he or she operates an operation button (not shown) installed in the dashboard (not shown). The driving unit 400 may be driven in response to an actuating signal transmitted from the control unit (not shown). The rotation member 420 may be rotated by the rotation motor 410, and both the moving unit 300 and the tilting unit 500 may be moved in the first section. In this case, while the entire holder unit 200 is rotated, the combiner C may be exposed to the outside of the housing 100.

If the driving unit 400 continues to operate, the moving unit 300 may remain stopped in the second section, and the tilting unit 500 may be moved towards the holder unit 200. The holder member 240 may be tilted in proportion to a distance of pressing the holder member 240 by the tilting unit 500, thus causing the combiner C to be tilted.

Figure 15A:
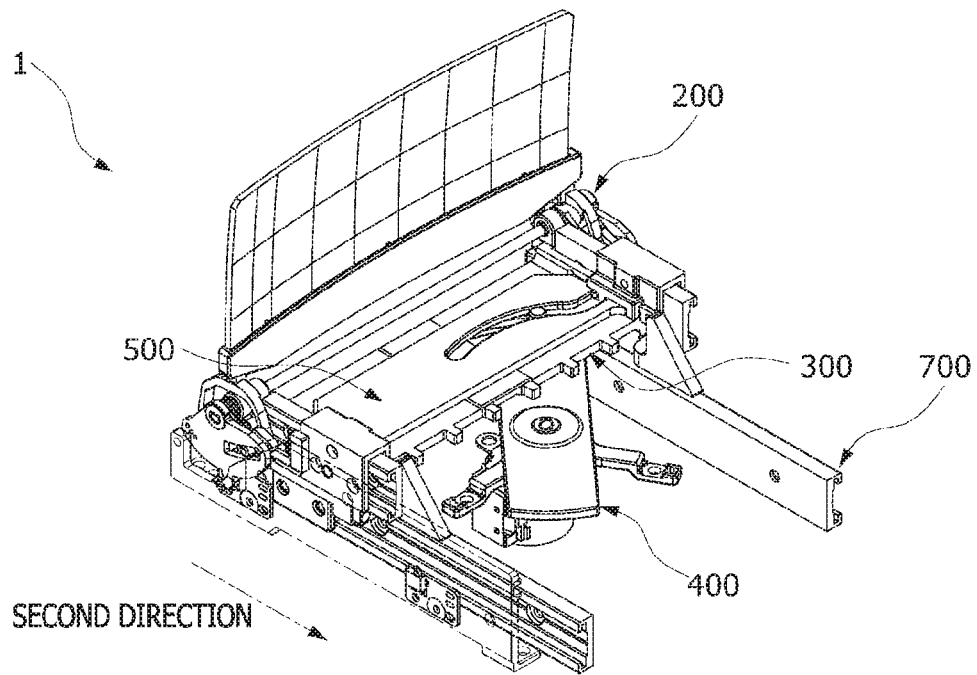
FIGS. 15A to 15C are views sequentially illustrating the process of accommodating the combiner in the housing in the head-up display apparatus for the vehicle.
Figure 15B:
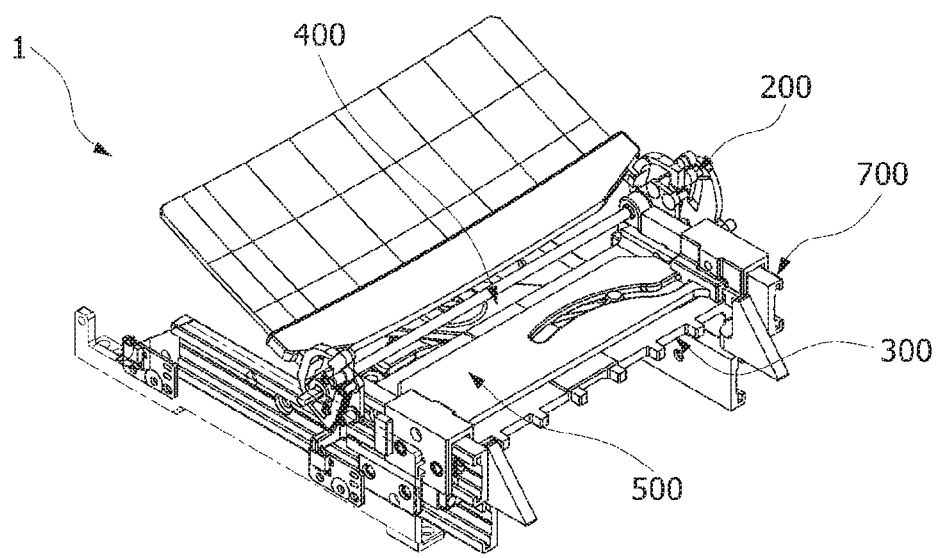
Figure 15C:
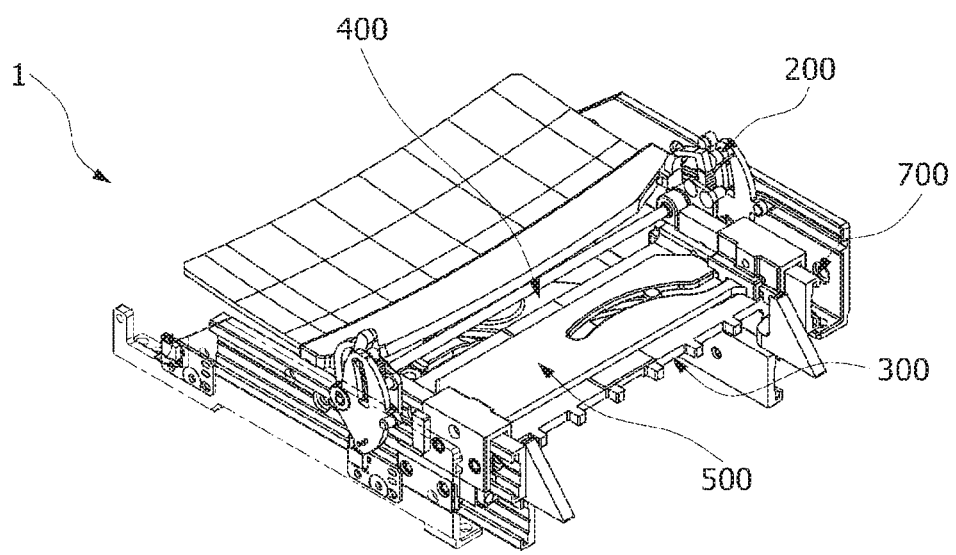

By contrast, as illustrated in FIGS. 15A to 15C, when the head-up display apparatus 1 for the vehicle is not used, a user operates the operation button installed in the dashboard again. In the state where the driving unit 400 is operated and the holder unit 200 and the moving unit 300 are stopped, only the tilting unit 500 may be moved towards the moving unit 300.

If the tilting unit 500 moves a predetermined distance, the contact of the holder member 240 with the tilting unit 500 is released and thereby the combiner C is restored to a position before it is tilted. Subsequently, the tilting unit 500 and the holder unit 200 may be moved in the second direction along with the moving unit 300. Thus, while the entire holder unit 200 is rotated, the combiner C may be accommodated in the housing 100.

Figure 16:
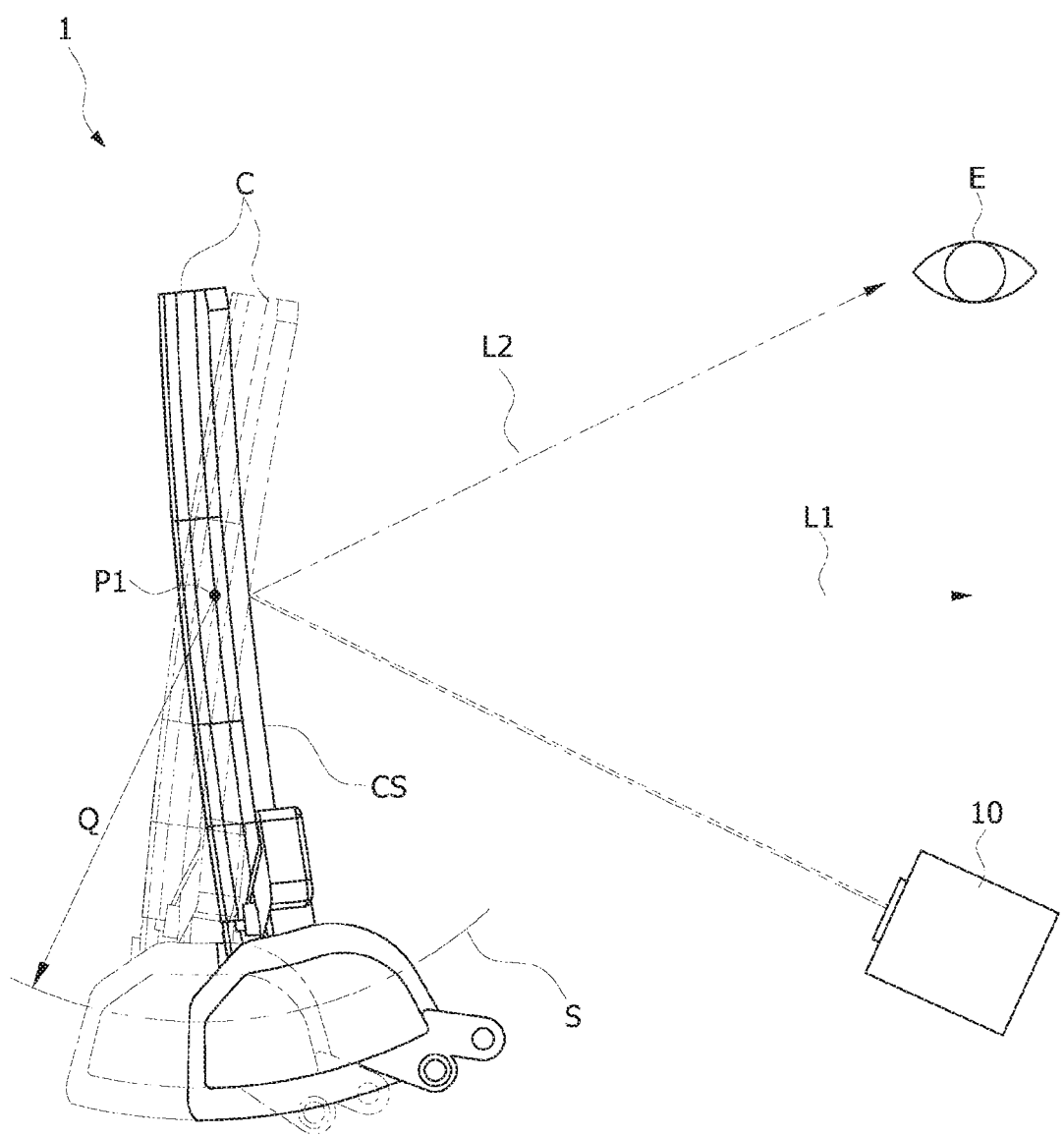
FIG. 16 is a view illustrating displacement resulting from the tilting of the combiner.

FIG. 16 is a view illustrating displacement resulting from the tilting of the combiner.

In FIG. 16, reference character E denotes the position of a user's eye, reference characters L1 and L2 denote the paths of indication light radiated from the display module 10, and reference character CS denotes a reflective surface of the combiner on which a virtual image is reflected.

Referring to FIG. 16, in the head-up display apparatus 1 for the vehicle in accordance with the embodiment of the present invention, the combiner C is tilted about a central axis P1, so that the moving trajectory S of the lower end of the combiner C becomes the arc of the radius Q around the central axis P1.

Therefore, even if the angle of the combiner C is changed, the reflecting position of the indication light radiated from the display module 10 on the reflective surface CS is scarcely changed, thus minimizing the deformation of the virtual image displayed on a user. Therefore, this may prevent the fatigue of a user's eyes caused by misperceiving or seeing a skewed virtual image, thus contributing to safe driving. Furthermore, the invention does not require an expensive aspherical combiner for correcting the deformation of the virtual image, thus reducing the manufacturing cost of the head-up display apparatus for the vehicle.

That is, as described above, the head-up display apparatus 1 for the vehicle in accordance with the embodiment of the present invention may cause the combiner C to rotate about the imaginary central axis P1 transverse to the combiner C. Therefore, the head-up display apparatus 1 for the vehicle in accordance with the embodiment of the present invention makes it easy to control the light path along which the imaginary image generated by the display module and reflected from the combiner C travels. Consequently, the invention allows the imaginary image reflected from the combiner C to be more clearly visible to a driver.

Furthermore, the head-up display apparatus 1 for the vehicle in accordance with the embodiment of the present invention allows the sliding member 510 included in the tilting unit 500 to be finely moved by the driving unit 400. Moreover, since the holder member 240 is pressed to be precisely tilted by the sliding member 510 while being guided along the tilting guide member 260, the resolution of the combiner C can be remarkably enhanced as compared to the conventional head-up display apparatus for the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A head-up display apparatus for a vehicle, comprising:
 a housing defining an interior space, with an entrance formed on a side of the housing;

a holder unit coupled at a side thereof to a combiner, the combiner going in and out through the entrance;

a moving unit located in the interior space of the housing, rotatably coupled to the holder unit, and coupled to the housing to reciprocate along a reciprocation axis, the moving unit reciprocating along the reciprocation axis to cause the combiner to be accommodated in the interior space of the housing or to be exposed to an outside through the entrance of the housing;

a driving unit coupled to the moving unit to move the moving unit; and a tilting unit slidably coupled to the moving unit and coupled to the driving unit, the tilting unit being moved by the driving unit to cause the combiner to be tilted around an imaginary central axis transverse to the combiner, wherein the holder unit comprises:
a holder shaft rotatably coupled to the moving unit,
a holder rotary member coupled to the holder shaft,
a holder member including a holder portion to which the combiner is coupled, and an arc portion formed on a side of the holder portion such that at least a part thereof is in an arc shape, and
a tilting guide member coupled to the holder shaft, located between the holder rotary member and the holder shaft, and formed to surround at least a part of the arc portion, thus guiding tilting of the holder member.

2. The head-up display apparatus of claim 1, wherein the holder unit further comprises:
an elastic member provided to elastically support the holder rotary member and the holder member, and causing the holder member to be restored to a position before it is tilted, if external force acting on the holder member is eliminated.

3. The head-up display apparatus of claim 2, wherein the holder unit comprises:
a first support protrusion protruding from a side of the holder rotary member to support one side of the elastic member; and
a second support protrusion protruding from a side of the holder member to support the other side of the elastic member.

4. The head-up display apparatus of claim 2, wherein the tilting unit comprises a sliding member slidably coupled to the moving unit, and moved by the driving unit in a state where the moving unit stops moving, thus applying external force to the holder member and consequently causing the holder member to be tilted.

5. The head-up display apparatus of claim 4, wherein the tilting unit further comprises a pressing member provided on a side of the sliding member to press the holder member.

6. The head-up display apparatus of claim 5,
wherein the holder unit comprises a guide pin protruding from an outside of the holder rotary member, and wherein a guide groove is formed on a portion in the housing with which the guide pin comes into contact, thus defining a movement path of the holder rotary member.

7. The head-up display apparatus of claim 4, wherein the driving unit comprises:
a rotation motor;
a rotation member rotated by the rotation motor; and
a driving pin provided on a side of the rotation member, and located to pass through the moving unit and the tilting unit.

8. The head-up display apparatus of claim 7, wherein the moving unit comprises a moving member slidably coupled to the housing and having a first guide groove through which the driving pin passes.

9. The head-up display apparatus of claim 8, wherein the first guide groove comprises:
a first movement path formed on an edge of the moving member and causing the moving member to be moved in one direction as the driving pin moves; and
a rest path connected with the first movement path, and having a curvature radius corresponding to a curvature radius of a moving trajectory of the driving pin.

10. The head-up display apparatus of claim 8, wherein a second guide groove is formed on the sliding member to allow the driving pin to passes therethrough,
the second guide groove comprising:
a second movement path formed on an edge of the sliding member and causing the sliding member to be moved along with the moving member as the driving pin moves; and
a tilting path connected with the second movement path, and having a curvature radius different from the curvature radius of the moving trajectory of the driving pin.

11. The head-up display apparatus of claim 1, wherein the imaginary central axis transverse to the combiner is an axis to prevent a change in position on a reflective surface of the combiner on which indication light is reflected, even if the combiner is tilted.

12. The head-up display apparatus of claim 1, further comprising a sensing unit provided in the interior space of the housing to detect a position of the moving unit, and detecting that the combiner is accommodated in the interior space of the housing or exposed to the outside, based on a detected position of the moving unit.

13. The head-up display apparatus of claim 12, wherein the sensing unit comprises:
a first position sensing member coupled to one side of the interior space of the housing to detect a position of the moving unit; and
a second position sensing member coupled to the other side of the interior space of the housing to detect a position of the moving unit.

* * * * *